United States Patent
Yamamoto et al.

(10) Patent No.: US 7,122,934 B2
(45) Date of Patent: Oct. 17, 2006

(54) ROTATING ELECTRIC MACHINE, MOTOR-DRIVEN VEHICLE AND RESIN INSERT-MOLDING METHOD

(75) Inventors: Noriaki Yamamoto, Chiyoda-ku (JP);
Fumio Tajima, Chiyoda-ku (JP);
Osamu Koizumi, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/962,471

(22) Filed: Oct. 13, 2004

(65) Prior Publication Data
US 2005/0146232 A1 Jul. 7, 2005

Related U.S. Application Data

(63) Continuation of application No. 10/392,183, filed on Mar. 20, 2003.

(30) Foreign Application Priority Data
Dec. 25, 2002 (JP) .............................. 2002-373397

(51) Int. Cl.
*H20K 1/28* (2006.01)
(52) U.S. Cl. .......................... 310/218; 310/43; 310/45; 310/194; 310/118; 310/259
(58) Field of Classification Search ................ 310/218, 310/43, 45, 194, 118, 198, 259
See application file for complete search history.

(56) References Cited

U.S. PATENT DOCUMENTS

| | | | | |
|---|---|---|---|---|
| 4,617,725 A | * | 10/1986 | Holter et al. ................... 29/598 |
| 5,698,923 A | * | 12/1997 | Scherzinger et al. ........ 310/194 |
| 5,945,763 A | * | 8/1999 | Bettelini ...................... 310/194 |
| 6,313,557 B1 | * | 11/2001 | De Filippis et al. ........ 310/216 |
| 6,509,665 B1 | | 1/2003 | Nishiyama et al. |
| 6,555,942 B1 | * | 4/2003 | Hsu ............................. 310/208 |
| 6,653,758 B1 | * | 11/2003 | Tsuneyoshi et al. ........ 310/216 |

FOREIGN PATENT DOCUMENTS

| | | |
|---|---|---|
| JP | 11-178259 | 7/1999 |
| JP | 2000-341889 | 12/2000 |
| JP | 2001-025198 | 1/2001 |
| JP | 2001-128402 | 5/2001 |

OTHER PUBLICATIONS

Product and services Rynite PET thermoplastic polyester resin (DuPont.com).
Japanese Office Action dated Jan. 17, 2005.

* cited by examiner

Primary Examiner—Darren Schuberg
Assistant Examiner—Iraj A. Mohandesi
(74) Attorney, Agent, or Firm—Crowell & Moring LLP

(57) ABSTRACT

A rotating electric machine comprises: a stator including a stator iron core having a plurality of slots and a stator winding incorporated in the plurality of slots; and a rotor rotatably disposed in the stator via a clearance; wherein a mold (i.e., a slot insulator) made of an insulating resin is brought into close contact with the surface of a projection (i.e., a tooth core) of the stator iron core, formed between the adjacent slots, the thickness of the mold at a portion of the projection wound with the stator winding being smaller than that of the mold at other portions. Thus, it is possible to provide the rotating electric machine in which thermal resistance generated between the stator winding and the stator iron core can be reduced, thermal transmittance of heat generated in the stator winding to the stator iron core can be enhanced, and the cooling efficiency of the stator winding can be enhanced.

25 Claims, 11 Drawing Sheets

ROTATING ELECTRIC MACHINE, MOTOR-DRIVEN VEHICLE AND RESIN INSERT-MOLDING METHOD

BACKGROUND OF THE INVENTION

The present invention relates to a rotating electric machine, a motor-driven vehicle which mounts the same thereon, and a method for inserting a resin into a stator iron core in a rotating electric machine.

There have been conventionally known rotating electric machines disclosed in, for example, Patent Literature 1 (Japanese Patent Application Laid-open No. 11-178259) and Patent Literature 2 (Japanese Patent Application Laid-open No. 2000-341889). These Patent Literatures disclose a rotating electric machine provided with a stator including a yoke (or referred to as a core back or a yoke iron core) and a tooth (or referred to as a tooth iron core) which is formed separately from the yoke and disposed in the yoke with a winding wound in a concentric manner (for example, see page 6 and FIGS. 1 to 6 of Patent Literature 1 or page 4 and FIGS. 1, 4, 6 and 7 of Patent Literature 2).

Furthermore, Patent Literature 1 discloses a stator fabricating method in which a bobbin wound with a winding is compressed, thereby forming a coil mold, which is then fitted to the tooth, and then, the tooth is fitted to the core back (for example, see page 10, FIGS. 3, 7 and 15 of Patent Literature 1). Patent Literature 2 discloses that a winding frame is inserted into the tooth by the use of an insulating member, a winding conductor is wound around the tooth, and the tooth wound with the winding conductor is coupled to the yoke (for example, see page 4 and FIGS. 2 to 6 of Patent Literature 2).

In recent years, an environmentally friendly car such as an electric car or a hybrid car has been prevailed in order to reduce an adverse influence of exhaust gas, which is discharged from a car, on the terrestrial environment. The number of such cars has been increased year after year. In order to increase the percentage of the environmentally friendly car, it is preferable to provide an environmentally friendly car of excellent traveling performance at a low cost.

In view of this, a rotating electric machine used as a drive source for an environmentally friendly car need be reduced in size and weight and suitable for rotation at a high speed since the rotating electric machine must be mounted on a vehicle. Moreover, high efficiency is required for the rotating electric machine in such a manner as to secure a sufficient traveling distance by one electric charging with the capacity of batteries while the number of batteries to be mounted on the vehicle is limited. Additionally, a high output is required for the rotating electric machine in such a manner as to output a large torque in low and middle speed regions. In addition, cost reduction is required for the rotating electric machine in such a manner as to provide an environmentally friendly car at a low cost.

The rotating electric machine disclosed in Patent Literature 1 or 2 adopts a system in which the core constituting the stator is formed of the yoke and the tooth in separation, wherein the winding is wound around the tooth, which is then disposed in the yoke, that is, a concentrically winding system with the separate cores, as described above, thereby enhancing the winding density of the winding inside of a slot. Consequently, the turning number of the winding inside of the slot is increased so as to increase the current density of the winding inside of the slot in the rotating electric machine disclosed in Patent Literature 1 or 2, and therefore, it is possible to achieve the miniaturization, the light weight and the high output of the rotating electric machine. Furthermore, the reduced cost and high efficiency of the rotating electric machine can be achieved in the rotating electric machine which adopts the system of the concentric winding with the separate core, as disclosed in Patent Literature 1 or 2 and as described above.

However, a copper loss of the winding inside of the slot is increased to increase heat generation in the winding when the current density of the winding inside of the slot is increased by increasing the turning number of the winding inside of the slot. Therefore, it is necessary to enhance the cooling efficiency of the winding. The heat generated in the winding is transmitted to the core via a slot insulator between the winding and the slot (or referred to as a slot liner) and air present between the winding and the tooth, and then, is radiated to the air or cooling water as a cooling medium from the core. The slot insulator and the air are thermal resistances. Consequently, the thermal resistance such as the slot insulator and the air need be reduced so that the heat generated in the winding can be easily transmitted to the core in order to enhance the cooling efficiency of the winding.

With regard to this point, the winding has been previously wound around the bobbin to form a coil mold, and then, the coil mold is fitted to the tooth in the rotating electric machine disclosed in Patent Literature 1, as described above. In this system, it is general that the dimension of the inner diameter of the bobbin is made greater than that of the outer diameter of the tooth in such a manner that the coil mold can be readily fitted to the tooth. Consequently, since the adhesiveness between the coil mold and the tooth is weak even if the thickness of the bobbin can be reduced so as to reduce the thermal resistance in the rotating electric machine disclosed in Patent Literature 1, an air layer is liable to be formed between the coil mold and the tooth, thereby increasing the thermal resistance. To solve this problem, it is conceived that the dimensional precision is enhanced to strengthen the adhesiveness between the coil mold and the tooth in the rotating electric machine disclosed in Patent Literature 1. However, in turn, the productivity is reduced, thus increasing a production cost.

In the meantime, an insulating member is inserted into the tooth so as to form a winding frame, and then, the winding is wound around the winding frame in the rotating electric machine disclosed in Patent Literature 2, as described above. In this system, the insulating member is brought into close contact with the tooth, so that an air layer is hardly formed between the insulating member and the tooth. Thus, this configuration is advantageous in reducing the thermal resistance. However, upper and lower dies are used as the mold when the insulating member is inserted into the tooth in the rotating electric machine disclosed in Patent Literature 2, thereby preventing the achievement of the satisfactory thickness precision of the insulating member inserted into the tooth. From experiments carried out by the present inventors, it was found that it was difficult to uniformly reduce the thickness of the insulating member in the tooth to 0.5 mm or smaller in the insulating member inserting method by the use of the upper and lower dies, as in the rotating electric machine disclosed in Patent Literature 2.

SUMMARY OF THE INVENTION

An object of the present invention is to provide a rotating electric machine capable of enhancing the cooling efficiency of a stator winding by enhancing thermal transmittance of heat generated in the stator winding to a stator iron core.

Specifically, an object of the present invention is to provide a rotating electric machine capable of reducing thermal resistance generated between a stator winding and a stator iron core.

A rotating electric machine according to the present invention comprises: a stator including a stator iron core having a plurality of slots and a stator winding incorporated in the plurality of slots; and a rotor rotatably disposed in the stator via a clearance; wherein a mold made of an insulating resin is brought into close contact with the surface of a projection of the stator iron core, the projection being formed between the adjacent slots, the thickness of the mold at a portion of the projection wound with the stator winding being smaller than that of the mold at other portions.

According to the above-described rotating electric machine, the mold is brought into close contact with the surface of the projection of the stator iron core, so that an air layer is hardly formed between the stator iron core and the stator winding. Furthermore, since the thickness of the mold at the portion of the projection wound with the stator winding is smaller than that of the mold at the other portions, it is possible to reduce the thermal resistance between the stator iron core and the stator winding. Thus, according to the above-described rotating electric machine, it is possible to enhance the thermal transmittance of the heat Generated in the stator winding to the stator iron core, thereby enhancing the cooling efficiency of the stator winding.

According to the above-described rotating electric machine, since the thickness of the mold at the portion of the projection, other than the portion, around which the stator winding is wound, is greater than that of the mold at the portion, around which the stator winding is wound, for example, when the stator winding is wound, the stator winding is guided to the portion, around which the stator winding is wound (for example, referred to as a winding portion), and further, the strength of the portion, at which the stator winding wound around the winding portion (for example, referred to as a winding frame) can be kept. During the winding work of the stator winding after the mold is formed at the projection, no inconvenience is caused by the breakage of the winding frame of the mold or the like occurs during the winding work.

The thickness of the mold at the portion of the projection wound with the stator winding is 0.3 mm or smaller in the above-described rotating electric machine. Specifically, the thickness of the mold ranges from 0.2 mm to 0.3 mm. Here, the upper limit of the thickness of the mold is set to 0.3 mm in order to reduce the thermal resistance more than in the rotating electric machine in the prior art without changing the specifications of the stator winding or the stator iron core (for example, the thickness or turning number of the stator winding, the dimension of the stator iron core and the like) in the same thickness as that of the mold for the rotating electric machine in the prior art in which the stator winding has been previously wound around the mold, and then, the mold is fitted to the projection. Furthermore, the lower limit of the thickness of the mold is set to 0.2 mm in order to prevent any deterioration of the function of the mold as the slot insulator.

In the above-described rotating electric machine, the stator winding is wound around the projection in a concentric manner. The stator iron core includes an annular yoke and a plurality of teeth, which form the plurality of projections projecting from the yoke in one radial direction and form the plurality of slots, the plurality of teeth being formed separately from the yoke and disposed in the yoke. Each of the teeth is molded by inserting the insulating resin at the surface of a laminate formed by laminating a plurality of iron cores. In this manner, the separation core system is used for the stator iron core, and further, the stator winding is wound in a concentric manner. Thus, it is possible to enhance the productivity of the stator, and further, to increase the density of the stator winding inside of the slot.

Furthermore, another object of the present invention is to provide a motor-driven vehicle of excellent traveling performance at a reduced cost. In the above-described motor-driven vehicle comprising: a vehicle-mounted power source; an electric machine which is driven in response to an output from the vehicle-mounted power source; and a transmission mechanism for transmitting an output from the electric motor to drive wheels, the above-described rotating electric machine is used as the electric motor.

The above-described motor-driven vehicle is an environmentally friendly car such as an electric car in which the vehicle-mounted power source is a battery, the electric motor being driven in response to an output from the battery, the electric motor being only one drive source for driving the drive wheels, or a hybrid car in which the vehicle-mounted power source is a battery, the electric motor being driven in response to an output from the battery, the electric motor constituting a drive source for the drive wheels in cooperation with an internal combustion engine. In addition, the above-described motor-driven vehicle is, for example, a four-wheel drive car in which the vehicle-mounted power source is a power generator to be driven by an internal combustion engine, the electric motor being driven in response to an output from the power generator, the electric motor being a drive source for driving drive wheels different from those to be driven by the internal combustion engine. Besides, the above-described motor-driven vehicle is, for example, an industrial vehicle such as a battery type fork lift for loading or unloading baggage.

A further object of the present invention is to provide an inserting method capable of performing resin molding with high accuracy and, more particularly, to provide an inserting method suitable for resin molding in a stator iron core in a rotating electric machine.

The above-described inserting method is used, for example, in the case where an insulating resin is inserted into each of a plurality of tooth iron cores disposed in yoke iron cores by winding a stator winding in a concentric manner, the stator iron core in the rotating electric machine being constituted of the yoke iron cores and formed separately from the yoke iron cores.

The above-described inserting method can be achieved by carrying out a series of processes comprising the steps of: preparing at least four dies having a molding part formed in such a manner that the insulating resin is molded into a predetermined shape; fixing the tooth iron core to a lower die; disposing slide dies in such a manner as to hold the tooth iron core on both sides thereof; pressing the slide dies downward against the lower die with an upper die in such a manner that the slide dies approach each other; moving the slide dies in a direction perpendicular to the pressing direction; bringing the upper die, the lower die and the slide dies to close contact with each other; injecting the insulating resin into a clearance defined between the upper die, the lower die and the slide dies and the tooth iron core; hardening the insulating resin; and inserting the insulating resin into each of the plurality of tooth iron cores.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENT

Figure 19:
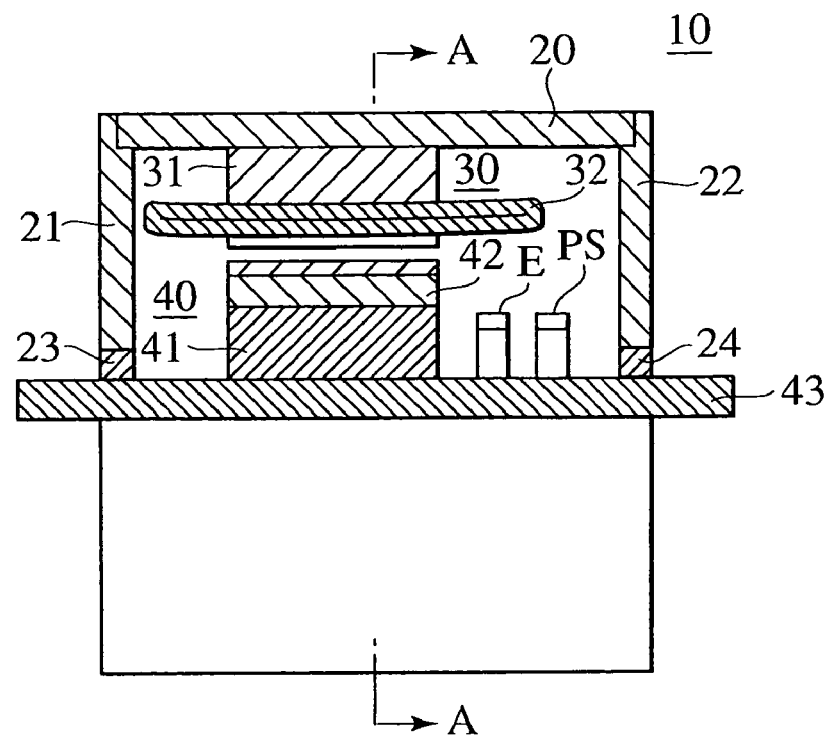
FIG. 19 is a cross-sectional view showing the general configuration of the electric motor in the preferred embodiment according to the present invention.

A description will be given below of a rotating electric machine in a preferred embodiment according to the present invention in reference to the accompanying drawings. In the present embodiment, the rotating electric machine is exemplified by a permanent magnet type three-phase AC synchronous electric motor 10 (hereinafter simply referred to as "an electric motor 10") which is mounted on a motor-driven vehicle such as an electric car. FIG. 19 shows the general configuration of the electric motor 10. In FIG. 19, reference numeral 20 represents a cylindrical stator frame (also referred to as "a housing"). Inside of the stator frame 20, there is housed a cylindrical stator 30 having a stator winding 32 (also referred to as "a field winding") incorporated in a plurality of slots formed in a stator iron core 31 (also referred to as "a field iron core"). A field current flows in the stator winding 32 by applying a voltage to the stator winding 32, so that the stator 30 generates a revolving field. The stator frame 20 is made of a metallic material having a high heat conductivity and a light weight such as aluminum.

On the inner circumference of the stator 30 via a clearance, there is provided a rotor 40 having a plurality of permanent magnets 42 embedded in a columnar rotor iron core 41 (also referred to as "an armature iron core") fitted onto the outer periphery of a rotary shaft 43. The rotary shaft 43 extends outward in an axial direction from both axial ends of the rotor iron core 41, and is rotatably supported by bearings 23 and 24 respectively disposed on the inner circumference of annular end plates 21 and 22 (also referred to as "end brackets") for closing openings at both axial ends of the stator frame 20. Consequently, the rotor 40 is arranged coaxially with the stator 30, and is rotated by the effect of the revolving field from the stator 30 disposed opposite thereto via the clearance.

On the rotary shaft 43 at one side end in the axial direction of the rotor 40, there are provided a magnetic pole position detector PS for detecting the position of the magnetic pole (i.e., the permanent magnet 42) of the rotor 40 and an encoder E for detecting the position of the rotor 40. Detection signals from the detector PS and the encoder E are input into a controller, not shown, for controlling the drive of the electric motor 10. The controller performs calculation in response to the input detection signal or a command signal output from a host control unit, so as to control a voltage which should be applied to the stator winding 32 in the electric motor 10. The electric motor 10 is driven with the application of the voltage controlled by the controller to the stator winding 32.

Figure 18:
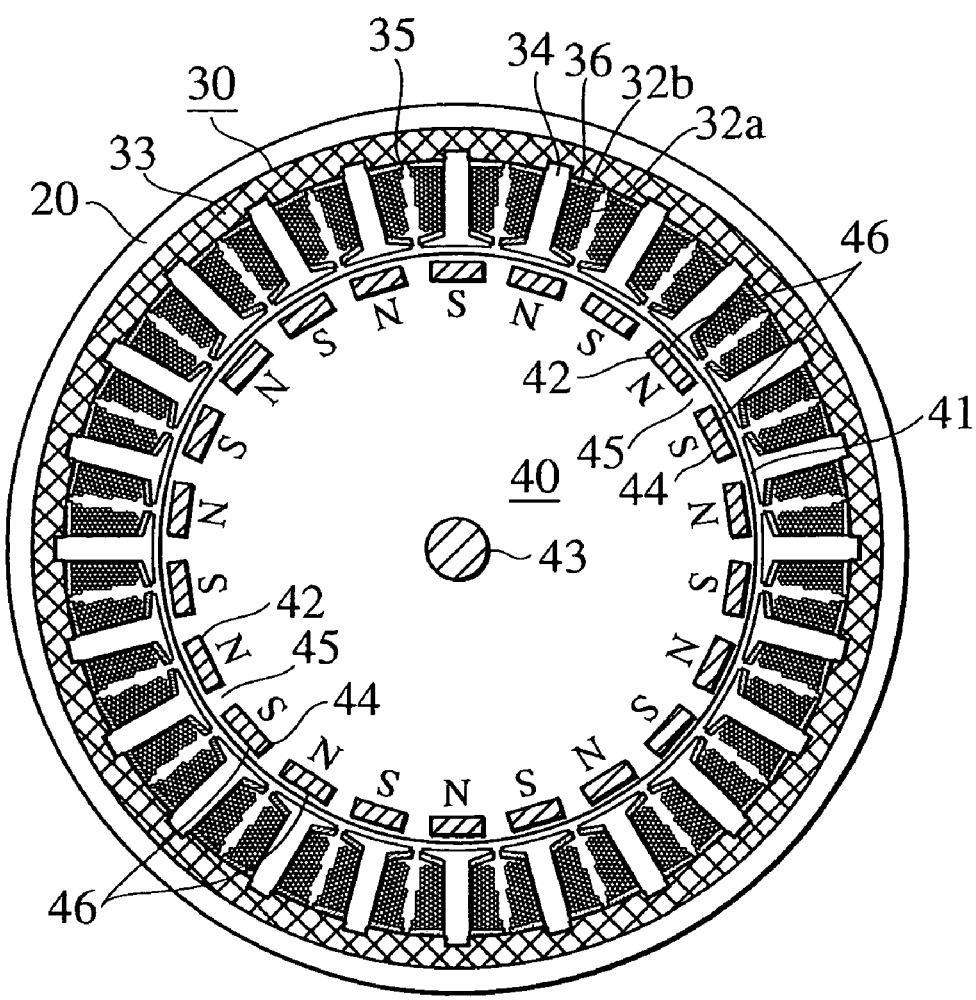
FIG. 18 is a cross-sectional view showing the general configuration of an electric motor in the preferred embodiment according to the present invention, taken along an arrow A—A of FIG. 19.

FIG. 18 is a view showing the electric motor 10, taken along an arrow A—A. The stator core iron 31 includes a yoke unit (also referred to as "a core back") and a tooth unit (also referred to as "a projection unit" or "a projecting pole unit"). The yoke unit consists of a cylindrical yoke core 33 (also referred to as "a core back") fitted to the inner circumference of the stator frame 20. The yoke core 33 is formed by laminating a plurality of annular magnetic members, for example, a plurality of annular silicon steel plates in the axial direction. The tooth unit consists of a plurality of tooth cores 34, which are constituted separately from the yoke core 33, and further, are arranged in the circumferential direction with predetermined intervals and fitted at one radial end thereof to the inner circumference of the yoke core 33. In the present embodiment, 24 tooth cores 34 are disposed at the inner circumference of the yoke core 33. That is to say, there can be provided the stator 30 having 24 stator poles. The tooth core 34 is formed by laminating a plurality of magnetic members in a predetermined shape, for example, a plurality of silicon steel plates in a predetermined shape in the axial direction.

A slot 35 is formed in a manner continued in the axial direction and opened toward the rotor 40 between the adjacent tooth cores 34. A slot insulator 36 is disposed in each of the tooth cores 34 with a unit winding 32*a* constituting the stator winding 32 disposed therein. Consequently, one side of the unit winding 32*a* disposed in each of the two adjacent tooth cores 34 corresponding to each other is contained in each of the slots 35. The unit winding 32*a* is constituted by winding a plurality of winding conductors 32*b* around the tooth core 34 via the slot insulator 36.

Here, like in the present embodiment, a winding system, in which the plurality of winding conductors 32*b* are wound around each of the tooth cores 34 via the slot insulator 36, and further, the unit winding 32*a* is disposed in each of the tooth cores 34 via the slot insulator 36, in other words, in which one unit winding 32*a* is wound around one tooth core 34, is referred to as concentric winding. From another point of view, the concentric winding also is referred to as a winding system, in which the unit winding 32*a* is contained between the adjacent slots 35 astride the tooth core 34 interposed between the adjacent slots 35.

The present embodiment adopts a split core system in which the yoke core 33 and the tooth core 34 are formed separately from each other and the tooth core 34 having the unit winding 32*a* wound therearound is disposed in the yoke core 33, thereby obtaining the stator iron core 31, thereby facilitating the winding work of the stator winding 32 around the stator iron core 31, and therefore, making it possible to enhance the productivity of the electric motor 10. Thus, the fabricating cost of the electric motor 10 can be reduced in the present embodiment. It is construed that the split core system like in the present embodiment is the effective technique, in particular, in producing the electric motor, which is small in size and great in number of stator poles (the number of tooth cores).

Furthermore, since the concentrically winding system is adopted in the present embodiment, the electric motor 10 can be reduced in size by reducing the length of the end (i.e., the coil end) of the stator winding 32 projecting outward in the axial direction from both ends in the axial direction of the stator iron core 31, and the stator winding 32 can be increased in density inside of the slot 35. Moreover, in the present embodiment in which the stator winding 32 can be increased in density inside of the slot 35, it is possible to reduce the size of the stator iron core 31 so as to miniaturize the electric motor 10, to reduce the winding resistance of the stator winding 32 so as to enhance the efficiency of the electric motor 10, to reduce the thermal resistance (i.e., the copper loss) between the stator iron core 31 and the stator winding 32 so as to enhance the cooling performance of the electric motor 10, to increase the winding number of the stator winding 32 so as to achieve the high output of the electric motor 10, and the like.

The rotor iron core 41 is formed by laminating a plurality of annular magnetic members, for example, a plurality of annular silicon steel plates in the axial direction. On the outer periphery of the rotor iron core 41 are formed 22 permanent magnet inserting holes 44, which are arranged at equal intervals in the peripheral direction and each of which penetrates from one side end in the axial direction toward the other side end in the axial direction. Each of the permanent magnet inserting holes 44 is inevitably formed when the annular silicon steel plates are laminated since openings of the same shape, the same dimension and the same number have been previously formed at the same portion on the outer periphery of each of the annular silicon steel plates before the lamination.

The permanent magnet 42 is inserted into each of the permanent magnet inserting holes 44. Consequently, the rotor 40 having the 22 permanent magnets 42 embedded in the outer periphery of the rotor iron core 41. That is to say, it is possible to provide the rotor 40 of the permanent magnet embedding type in which the number of rotor poles is 22. In this manner, the permanent magnet 42 is embedded in the rotor iron core 41 in the present embodiment, thereby increasing the resistance against the centrifugal force of the rotor 40, so as to provide the electric motor 10 suitable for rotation at a high speed.

The permanent magnets 42 of S and N poles are alternately inserted into the permanent magnet inserting holes 44 in the circumferential direction in such a manner that the adjacent permanent magnets 42 are reverse in pole to each other. In this manner, an auxiliary magnetic pole 45 is formed at the portion of the rotor iron core 41 between the adjacent permanent magnets 42. The auxiliary magnetic pole 45 constitutes a magnetic circuit which bypasses the magnetic circuit consisting of the permanent magnets 42, and is a region in which a magnetic flux is directly generated on the side of the rotor 40 by the magnetomotive force of the stator 30. Furthermore, a magnetic pole piece 46 is formed at the portion of the rotor iron core 41 on the outer periphery of the permanent magnet 42. The magnetic pole piece 46 is a region constituting a magnetic circuit for allowing the magnetic flux from the permanent magnet 42 to flow toward the stator 30 via a clearance defined between the stator 30 and the rotor 40.

In the present embodiment, both of the torque caused by the magnetic flux from the permanent magnet 42 and the torque caused by a reluctance component of the auxiliary magnetic pole 45 can be used together, thereby enhancing the efficiency of the electric motor 10. Moreover, a loose field control can be achieved by the effect of the auxiliary magnetic pole 45 in the present embodiment, thus enlarging the region of the operation at a high speed in the electric motor 10. Additionally, the magnetic pole piece 46 consists of a magnetic member in the present embodiment, thereby alleviating a pulsating magnetic flux of the stator magnetic pole.

Figure 1:
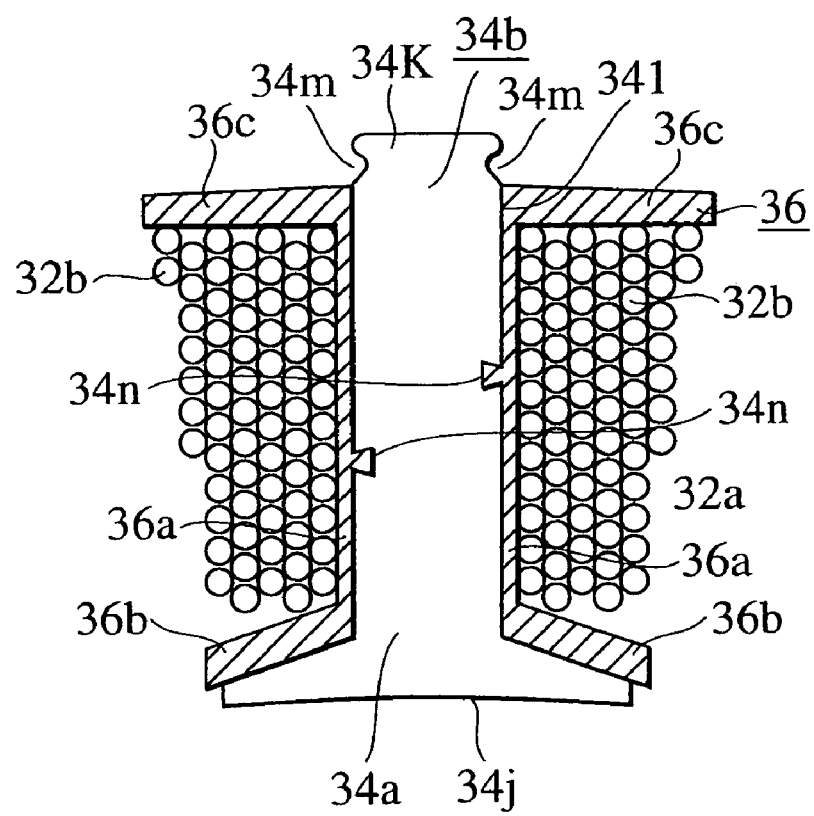
FIG. 1 is a cross-sectional view showing the configuration of one tooth core before the tooth core is disposed in a yoke core in an electric motor in a preferred embodiment according to the present invention, in the state in which a unit winding is disposed in tooth core via a slot insulator.
Figure 2:
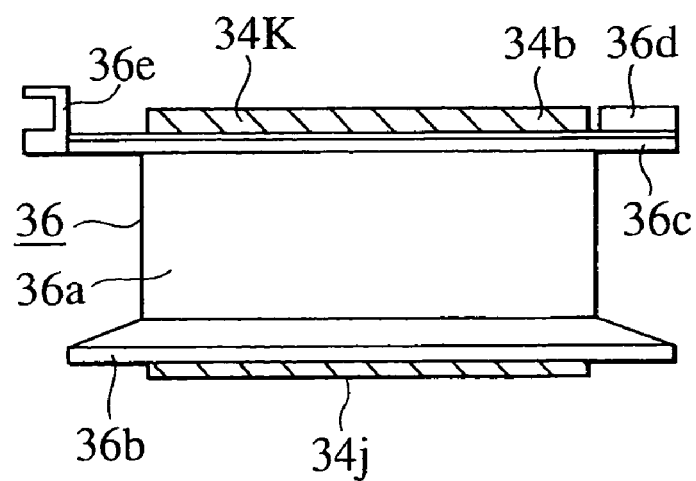
FIG. 2 is a side view showing the tooth core shown in FIG. 1, as viewed in a lateral direction (i.e., in a direction perpendicular to an axial direction of a rotating axis), in the state in which the slot insulator is applied to the tooth core.
Figure 3:
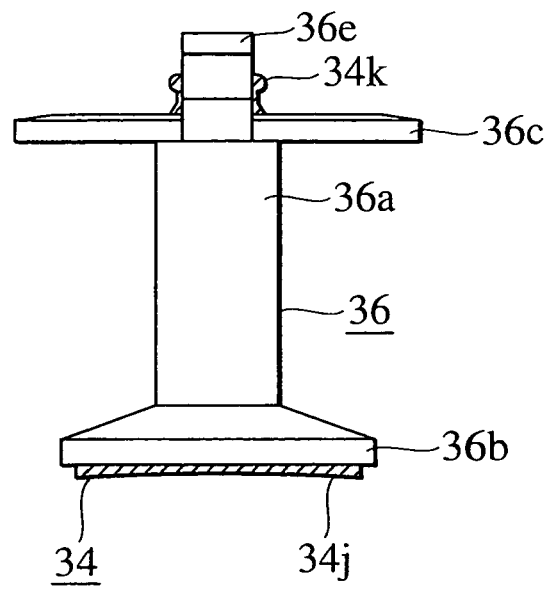
FIG. 3 is a side view showing the tooth core shown in FIG. 1, as viewed from one side in a longitudinal direction (i.e., in the axial direction of the rotating axis), in the state in which the slot insulator is applied to the tooth core.
Figure 4:
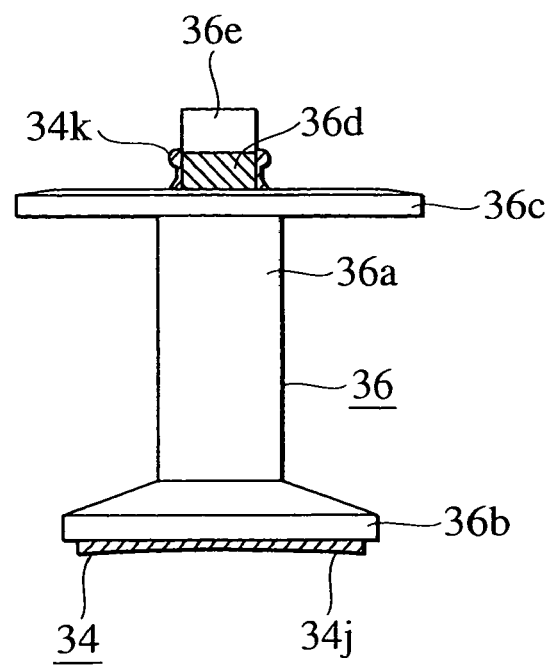
FIG. 4 is a side view showing the tooth core shown in FIG. 1, as viewed from the other side in the longitudinal direction (i.e., in the axial direction of the rotating axis), in the state in which the slot insulator is applied to the tooth core.
Figure 5:
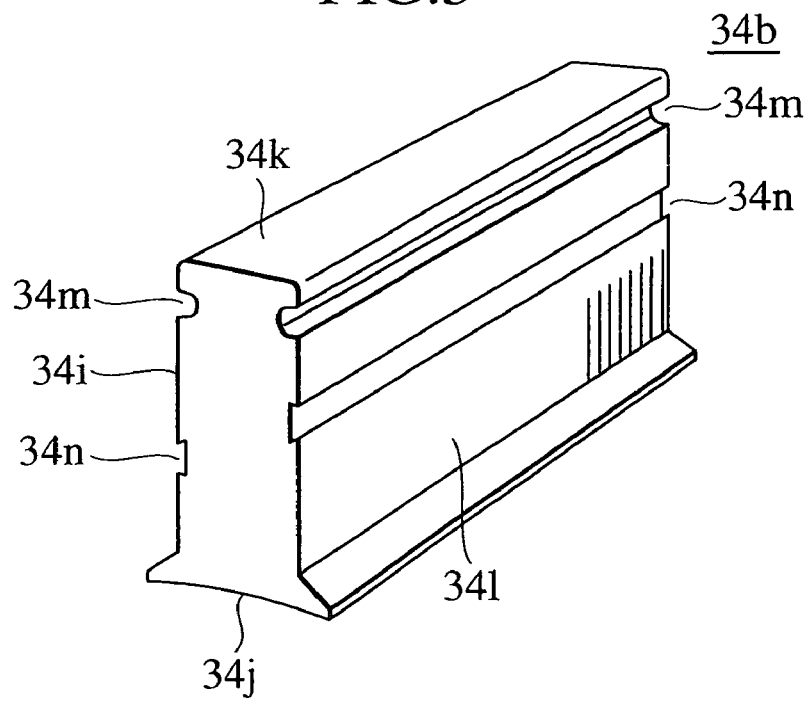
FIG. 5 is a perspective view showing the configuration of the tooth core shown in FIG. 1.
Figure 6:
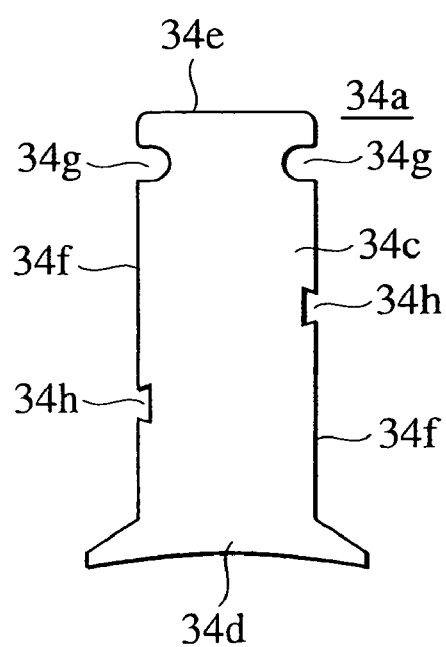
FIG. 6 is a plan view showing the configuration of a tooth core member constituting the tooth core shown in FIG. 1.

Subsequently, a detailed description will be given below of the configuration of the stator 30 in the electric motor 10 in the present embodiment in reference to FIGS. 1 to 17. FIGS. 1 to 6 show the configuration of one tooth core 34. The tooth core 34 is a laminate 34*b* obtained by laminating, as shown in FIG. 5, a plurality of tooth core members 34*a* shown in FIG. 6. The tooth core member 34*a* can be obtained by punching a thin plate-like silicon steel plate as a magnetic member exhibiting a high magnetic permeability with a punch. The plurality of laminated tooth core members 34*a* are caulked inside of the punch, to be thus tightened together. Otherwise, the plurality of laminated tooth core members 34*a* are tightened together by welding the outer periphery of the laminate 34*b* with a laser after the lamination.

The tooth core member 34*a* is formed into a substantially inverted T shape defined by a straight portion 34*c* and a divergent portion 34*d* divergently extending from one tip in the longitudinal direction of the straight portion 34*c* toward a direction substantially perpendicular to the longitudinal direction, i.e., toward a lateral direction. At the tip on a side opposite to the divergent portion 34*d* side of the straight portion 34c, there is formed an intrusion forming portion 34e, at which an intrusion serving as a tightening portion of the laminate 34b to the yoke core 33 should be formed, as described later. Furthermore, cutouts 34g used for forming grooves serving as tightening portions of the laminate 34b to the yoke core 33, as described later, are cut out at the tip on the side opposite to the divergent portion 34d side of the straight portion 34c and symmetric portions on two long sides 34f facing to each other in the straight portion 34c. Moreover, other cutouts 34h used for forming grooves formed at the laminated surface of the laminate 34b, as described later, are cut out at the center of the straight portion 34c and asymmetric portions on the two long sides 34f facing to each other in the straight portion 34c.

The laminate 34b includes a rectangular winding wound portion 34i, which is formed by laminating the tooth core members 34a on the straight portions 34c thereof and the unit winding 32a is disposed via the slot insulator 36, and a tooth core tip 34j, which is formed by laminating the tooth core members 34a on the divergent portions 34d thereof. At the tip of the winding wound portion 34i on a side opposite to the tooth core tip 34j, there is formed an intrusion 34k constituting a tooth core tightening portion to the yoke core 33. Additionally, grooves 34m which constitute tooth core tightening portions to the yoke core 33 and the intrusions formed at the yoke core 33 are intruded at the tip of the winding wound portion 34i on the side opposite to the tooth core tip 34j and symmetric portions of two laminate thick faces 34l facing to each other in the winding wound portion 34i (i.e., two laminate thick faces 34l, in which the unit winding 32a is disposed via the slot insulator 36).

At asymmetric portions at the centers of the two laminate thick faces 34l facing to each other in the winding wound portion 34i, there are formed grooves 34n for preventing any short shot or expansion of a resin at the time of resin inserting, described later. The groove 34n is formed in parallel to the longitudinal direction of the tooth core members 34a forming the laminate 34b (or in a direction in which the stator 30 and the rotor 40 face each other, or in a direction of a magnetic path in which the magnetic flux formed by the stator winding 32 flows) in such a manner as not to prevent the flow of the magnetic flux in the magnetic path. The intrusion 34k and the grooves 34m and 34n are formed continuously from one end in the lamination direction of the laminate 34b toward the other end thereof.

Figure 7:
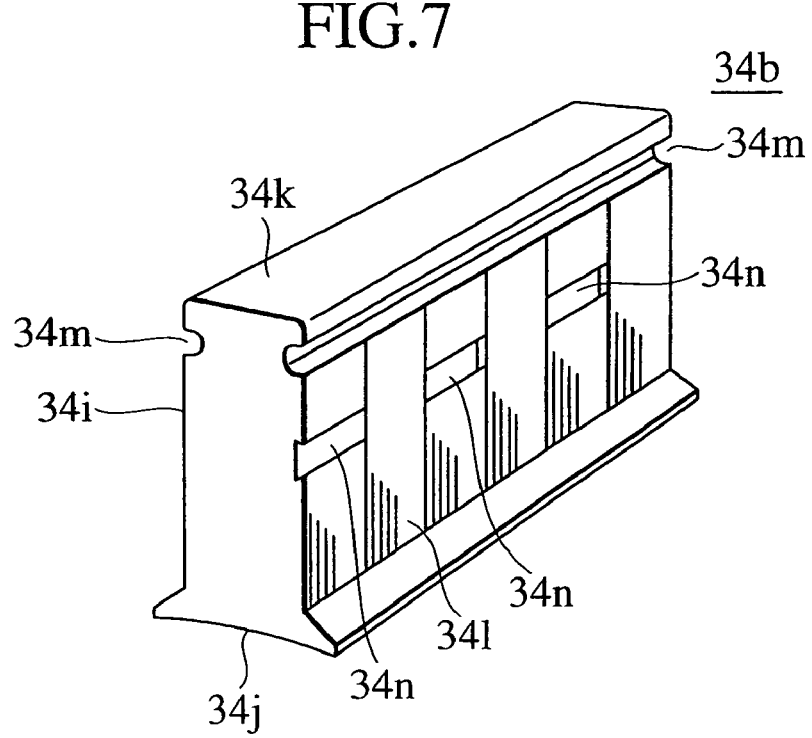
FIG. 7 is a perspective view showing another configuration of the tooth core.
Figure 8:
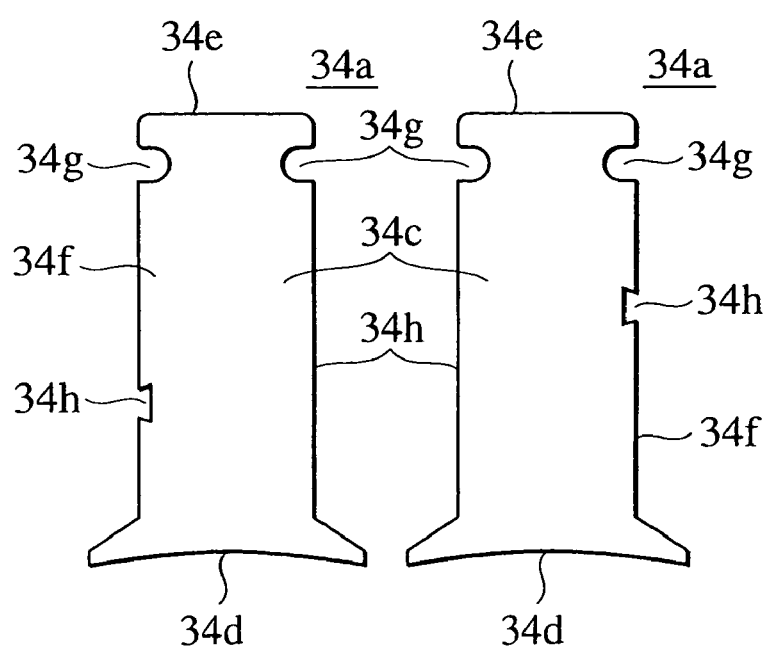
FIG. 8 is a plan view showing the configuration of a tooth core member constituting the tooth core shown in FIG. 7.
Figure 9:
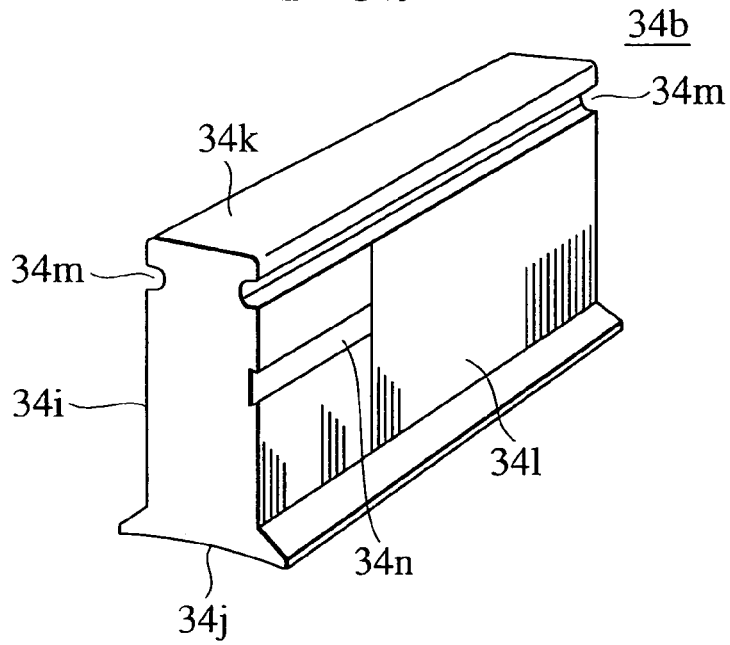
FIG. 9 is a perspective view showing a further configuration of the tooth core.

Incidentally, the present embodiment has been described above in which the grooves 34n continuously from one end in the lamination direction of the laminate 34b toward the other end thereof are formed at the asymmetric portions at the centers of the two laminate thick faces 34l facing to each other in the winding wound portion 34i. However, grooves 34n may be formed as follows: as shown in FIGS. 7 and 8, portions with grooves 34n continued in the lamination direction of the laminate 34b and portions without grooves 34n may be alternately formed in the lamination direction of the laminate 34b at one of the asymmetric portions at the centers of the two laminate thick faces 34l facing to each other in the winding wound portion 34i, and further, portions with grooves 34n continued in the lamination direction of the laminate 34b and portions without grooves 34n may be alternately formed in the lamination direction of the laminate 34b at the other asymmetric portion at the centers of the two laminate thick faces 34l facing to each other in the winding wound portion 34i by the use of a tooth core member 34a having a cutout 34h formed at one of asymmetric portions on the two long sides 34f facing to each other in the straight portion 34c and another tooth core member 34a having a cutout 34h formed at the other asymmetric portion on the two long sides 34f facing to each other in the straight portion 34c in such a manner that the grooves 34n can be formed at different portions in the lamination direction of the laminate 34b at one and the other of the asymmetric portions at the centers of the two laminate thick faces 34l facing to each other in the winding wound portion 34i. In addition, the short shot or expansion of the resin at the time of the resin inserting is liable to occur at a gate position in resin molding. Therefore, a groove 34n continued in the lamination direction of the laminate 34b may be formed only in the vicinity of the gate position in the resin molding, as shown in FIG. 9.

In the laminate 34b is provided a mold, at which the slot insulator 36 is formed and which is used for forming a coil bobbin, to which the unit winding 32a is disposed. The mold is molded by inserting an engineering plastic resin such as a resin having thermoplasticity of excellent flowability, good thermal resistance and strength endurable for high density winding of the unit winding 32a, for example, an LCP resin (i.e., a liquid crystal polymer resin) and a PPS resin (a polyphenylene sulfide resin) at the side circumferential surfaces of the laminate 34b (i.e., the surface of the tooth core member 34a and the laminate thick faces 34l at both ends in the lamination direction of the laminate 34b), as described later.

The mold includes a winding wound portion 36a, which is brought into close contact with the side circumferential surface of the laminate 34b and around which the unit winding 32a is disposed in a high density by winding the winding conductor 32b in a high density, and winding frames, that is, a winding frame 36b on the tooth core tip side and a winding frame 36c on the yoke core tightening portion side, which guide the winding conductor 32b to the winding wound portion 36a when the winding conductor 32b is wound, and further, hold the unit winding 32a disposed in the winding wound portion 36a.

The winding frame 36b on the tooth core tip side extends from the circumferential edge on one side (i.e., on the side of the tooth core tip) of the winding wound portion 36a along the surface of the tooth core tip 34j continuous to the surface of the laminate thick face 34l in such a manner as to bend substantially vertically in a direction separate from the side circumferential surface of the laminate 34b (in a substantially vertical direction with respect to the longitudinal direction of the tooth core member 34a forming the laminate 34b, in a substantially vertical direction with respect to the direction in which the stator 30 and the rotor 40 face to each other, or in a substantially vertical direction with respect to the direction of the magnetic path in which the magnetic flux formed by the stator winding 32 flows), and further, is formed in such a manner as to be brought into close contact with the surface of the tooth core tip 34j. In the meantime, the winding frame 36c on the yoke core tightening portion side extends from the circumferential edge on the other side (i.e., on the side of the yoke core tightening portion) of the winding wound portion 36a in such a manner as to bend substantially vertically in the direction separate from the side circumferential surface of the laminate 34b (in the substantially vertical direction with respect to the longitudinal direction of the tooth core member 34a forming the laminate 34b, in the substantially vertical direction with respect to the direction in which the stator 30 and the rotor 40 face to each other, or in the substantially vertical direction with respect to the direction of the magnetic path in which the magnetic flux formed by the stator winding 32 flows).

At one end of the winding frame 36c on the yoke core tightening portion side in the lamination direction of the laminate 34b, an assembly guide 36d is provided for guiding the insertion of the tooth core 34 into the yoke core 33 when the unit winding 32a is wound around the yoke core 33 by disposing the unit winding 32a in each of the tooth cores 34. In the present embodiment in which the assembly guide 36d is provided in the mold in the above-described manner, it is possible to facilitate the assembling work of the tooth core 34 to the yoke core 33 and shorten a time required for the assembling work. The assembly guide 36d is made of the same resin as that of the mold, and it is molded integrally with the mold at the time of the insertion.

Moreover, the assembly guide 36d extends from one end of the winding frame 36c on the yoke core tightening portion side in the lamination direction of the laminate 34b up to the vicinity of the tightening portion of the tooth core 34 in such a manner as to easily guide the insertion of the tooth core 34 into the yoke core 33, and further, it is formed into a rectangular shape having substantially the same width (i.e., the dimension in a direction perpendicular to the lamination direction of the laminate 34b) as that of the tightening portion of the tooth core 34 (i.e., the dimension in the direction perpendicular to the lamination direction of the laminate 34b). Alternatively, the assembly guide 36d may be formed into a tapered shape having a width which is gradually reduced from the vicinity of the tightening portion of the tooth core 34 toward one end of the winding frame 36c on the yoke core tightening portion side in the lamination direction of the laminate 34b, or into a round or elliptical shape.

At the other end of the winding frame 36c on the yoke core tightening portion side in the lamination direction of the laminate 34b, there is formed a hook 36e for fixing a connecting line for connecting the unit winding 32a in each of u-, v- and w-phases when the terminal of the unit winding 32a disposed in each of the tooth cores 34 is treated after the unit winding 32a is disposed in the yoke core 33 by disposing the unit winding 32a in each of the tooth cores 34. In the present embodiment in which the hook 36e is provided in the mold in the above-described manner, it is possible to facilitate the treatment of the terminal of the unit winding 32a, so as to shorten a time required for the treatment. The hook 36e is made of the same resin as that of the mold, and it is molded integrally with the mold at the time of the insertion.

The thickness of the winding wound portion 36a of the mold (i.e., the thickness from the laminate thick face 34l of the laminate 34b) is 0.3 mm or smaller, which is smaller than the thickness of each of the winding frame 36b on the tooth core tip side and the winding frame 36c on the yoke core tightening portion side, and specifically, ranges from 0.2 mm to 0.3 mm. The winding wound portion 36a is formed in the substantially uniform thickness except for the portions of the grooves 34n. Here, the reason why the upper limit of the thickness of the winding wound portion 36a of the mold is set to 0.3 mm is that it is made to be identical in thickness to the mold of the rotating electric machine in the prior art, in which the mold having the unit winding wound therearound in advance is disposed in the tooth core, and thus, the thermal resistance is reduced more than in the rotating electric machine in the prior art without varying the specifications of the stator winding 32 or the stator iron core 31 (for example, the thickness or turning number of the winding conductor 32b, the dimension of the stator iron core 31, or the like). The reason why the lower limit of the thickness of the mold is set to 0.2 mm is that the function as the slot insulator 36 exhibited by the mold cannot be deteriorated.

Figure 10:
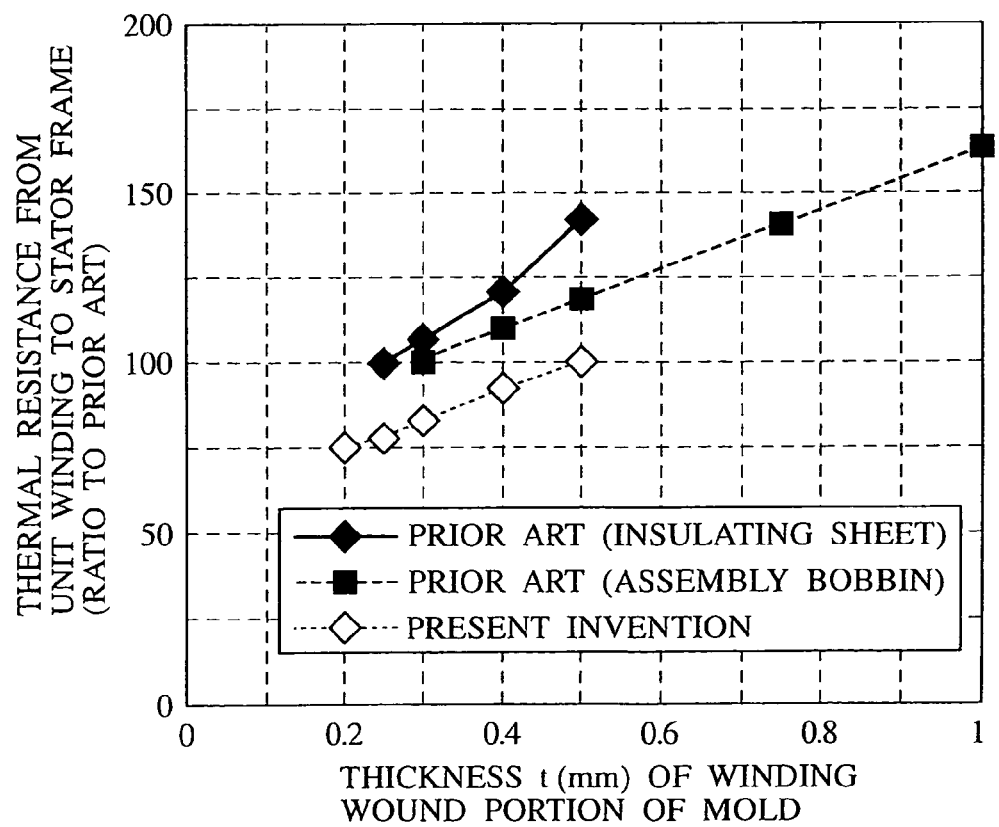
FIG. 10 is a graph illustrating the relationship between a thickness t (mm) of a winding wound portion of a mold (the slot insulator) and a thermal resistance from a unit winding to a stator frame (a ratio to the prior art)

FIG. 10 is a graph illustrating the relationship between a thickness t [mm] of the winding wound portion 36a of the mold and the thermal resistance from the unit winding 32a to the stator frame 20 (a ratio to the prior art). Here, the comparison is made among an insulating sheet, which has been conventionally used as a slot insulator (hereinafter referred to as "Prior art 1"), a mold in a rotating electric machine in the prior art, in which the mold having a unit winding wound therearound in advance is disposed in a tooth core (hereinafter referred to as "Prior art 2"), and the mold in the present embodiment. As is clear from the relationship illustrated in FIG. 10, with the mold in the present embodiment, the thermal resistance can be reduced than that of Prior art 2 in the same thickness as a minimum thickness (i.e., 0.3 mm) in Prior art 2. Furthermore, in the present embodiment, the thickness can be reduced more than Prior art 1 and Prior art 2, so that the thermal resistance can be reduced more. This is because the mold is brought into close contact with the side circumferential surface of the laminate 43b, thereby making it difficult to form an air layer between the side circumferential surface of the laminate 43b and the unit winding 32a, and further, making the thickness of the winding wound portion 36a of the mold thin and substantially uniform so as to reduce the thermal resistance by the inserting method, described later. Moreover, the thickness of each of the winding frame 36b on the tooth core tip side and the winding frame 36c on the yoke core tightening portion side is greater than that of the winding wound portion 36a, thus keeping the strength of the mold as the coil bobbin.

Figure 11:
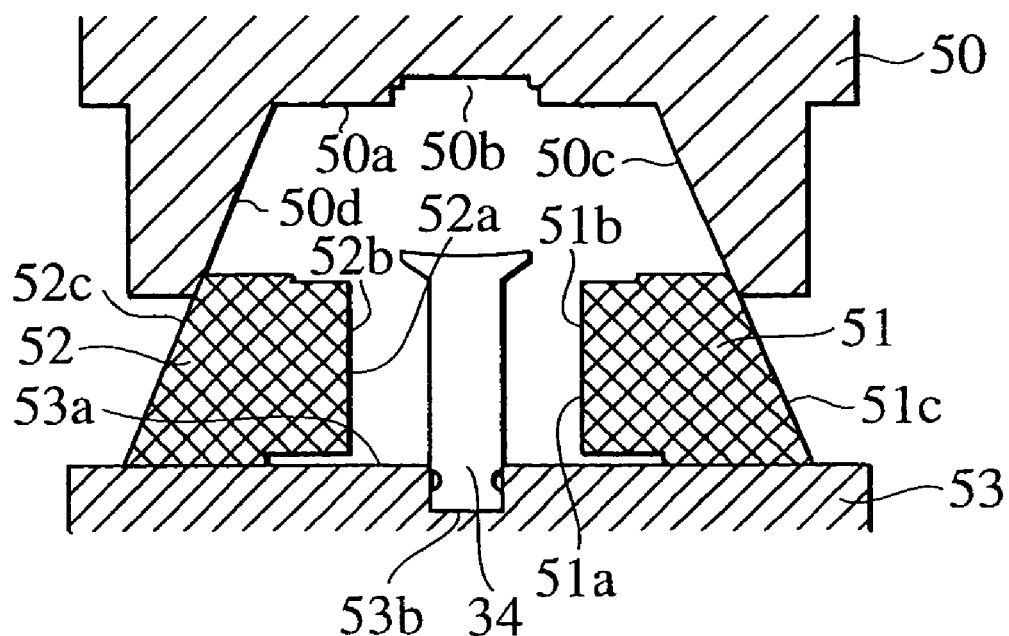
FIG. 11 is a view illustrating a resin insert-molding method for the slot insulator which is applied to the tooth core shown in FIG. 1, in the state before a mold is moved.
Figure 12:
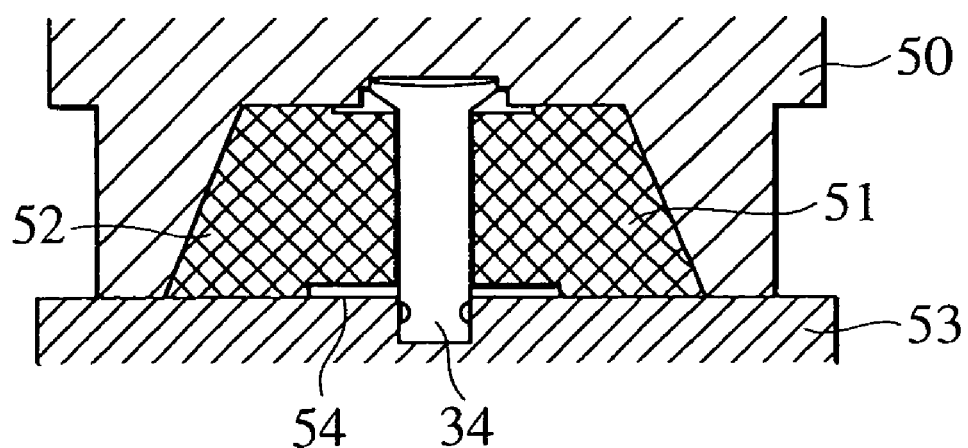
FIG. 12 is a view illustrating the resin insert-molding method for the slot insulator which is applied to the tooth core shown in FIG. 1, in the state after the mold has been moved.

Hereinafter, the resin insert-molding method in the present embodiment will be explained in reference to FIGS. 11 and 12. FIGS. 11 and 12 show the mold for use in performing the resin insert-molding method in the present embodiment.

In the present embodiment, in order to enhance the resin inserting precision, there are used four molding dies including an upper die 50, a lower die 53 and slide dies 51 and 52. The upper die 50 is a member formed into a concave shape, as viewed in cross section. At the bottom portion 50a of the upper die 50, there is provided a molding portion 50b, which is formed in such a manner as to mold the mold having the predetermined shape, as described above. The inner surfaces of the side portions 50c and 50d of the upper die 50 are tapered in such a manner as to be gradually reduced in distance between the side portions 50c and 50d facing to each other toward the bottom portion 50a. The slide dies 51 and 52 are members, both of which are formed into a trapezoidal shape, as viewed together in cross section. At the facing portion 51a or 52a of the slide die 51 or 52 facing to the counterpart slide portion 52 or 51, there is provided a molding portion 51b or 52b, which is formed in such a manner as to mold the mold having the predetermined shape, as described above. The not-facing portion 51c or 52c of the slide die 51 or 52 not facing to the counterpart slide portion 52 or 51 is tapered at the same tapering angle as that of the side portion 50c of the upper die 50 in order to align with the tapered side portion 50c of the upper die 50. The lower die 53 is a flat member. At the center of the upper surface 53a of the lower die 53, there is provided an inserting hole 53b, into which the tightening portion of the tooth core 34 is inserted for fixing the tooth core 34.

As shown in FIG. 11, first, the tooth core 34 is inserted into the inserting hole 53b formed at the lower die 53, and then, is fixed therein. Subsequently, the slide dies 51 and 52 are arranged at the sides of the tooth core 34 in such a manner as to hold the tooth core 34 therebetween. Next, the upper die 50 is mounted above the slide dies 51 and 52 in such a manner as to cover the slide dies 51 and 52 therewith, and then, is pressed toward the lower die 53. At this time, the pressing force of the upper die 50 toward the lower die 53 functions as a pressing force in the opposite direction of the side dies 51 and 52 (i.e., the pressing force in a direction perpendicular to that of the pressing force of the upper die 50 toward the lower die 53) by the effect of the taper formed at the upper die 50 and the slide dies 51 and 52, thereby pressing the slide dies 51 and 52. Consequently, the slide dies 51 and 52 are moved toward the tooth core 34 in such a manner as to approach each other.

As shown in FIG. 12, when the upper die 50 is pressed down until the side portions 50c and 50d of the upper die 50 are brought into contact with the lower die 53, the upper die 50, the lower die 53 and the slide dies 51 and 52 are brought into close contact with each other. As a result, a clearance (i.e., a space) 54 for forming the mold having the predetermined shape, as described above, is defined between the upper die 50, the lower die 53, and the slide dies 51 and 52 and the tooth core 34. Subsequently, the above-described insulating resin is injected into the clearance 54 via the gate, to be thus hardened. This series of processes is repeated by the number of tooth cores 34. Thus, the mold made of the insulating resin can be molded in the tooth core 34.

Since in the present embodiment, the mold is formed in the tooth core 34 by the above-described inserting method, the mold including the winding wound portion 36a having a substantially uniform thickness of 0.2 mm to 0.3 mm can be formed in close contact with the side circumferential surface of the tooth core 34. Furthermore, since the grooves 34n are formed in the tooth core 34 in the present embodiment, the resin injected into the clearance 54 flows in a more excellent manner, thereby forming the thin mold having the more uniform thinness. Moreover, since the resin stays in the grooves 34n in the present embodiment, it is more difficult to form an air layer between the side circumferential surface of the tooth core 34 and the resin. Additionally, since it is possible to prevent any short shot or expansion of the resin in the present embodiment, the mold of good quality can be obtained.

Incidentally, the clearance defined between the tooth core and the upper and lower dies cannot be finely controlled in the inserting method with the upper and lower dies like in the prior art thereby reducing the dimensional precision of the clearance, to thus make it difficult to reduce the thickness of the winding wound portion of the mold smaller than 0.5 mm. However, like in the present embodiment, the slide dies disposed in the two directions have the degree of freedom higher than those of the upper and lower dies, thereby controlling the clearance. Therefore, it is possible to form the clearance with the high dimensional precision. Consequently, in the present embodiment, it is possible to reduce the thickness of the winding wound portion in the mold smaller than 0.5 mm.

Figure 13:
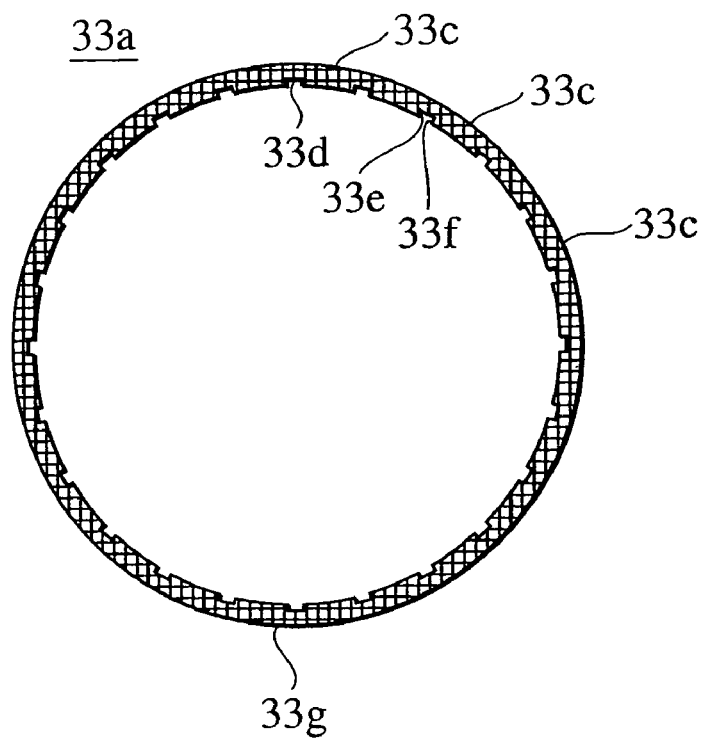
FIG. 13 is a plan view showing the configuration of a yoke core member constituting a yoke core, to which the tooth core shown in FIG. 1 is tightened.
Figure 14:
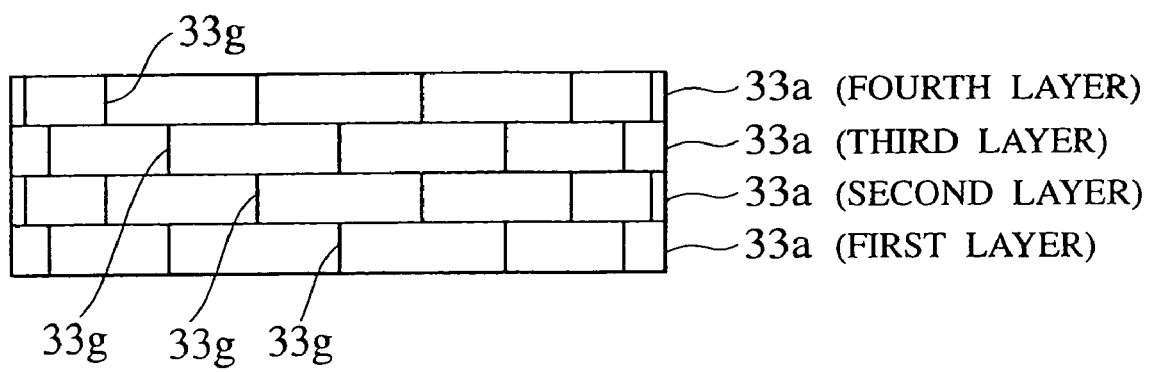
FIG. 14 is a plan view showing the laminated state of the yoke core member shown in FIG. 13.
Figure 15:
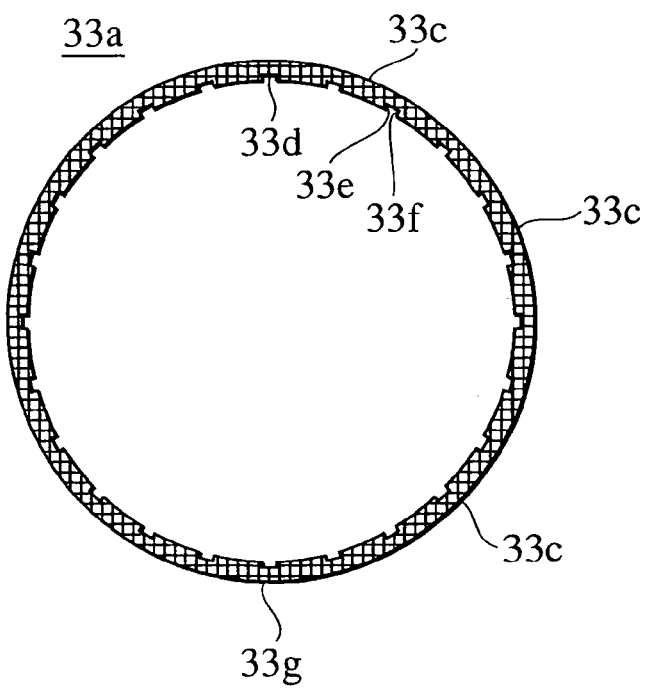
FIG. 15 is a plan view showing another configuration of the yoke core member constituting the yoke core.
Figure 16:
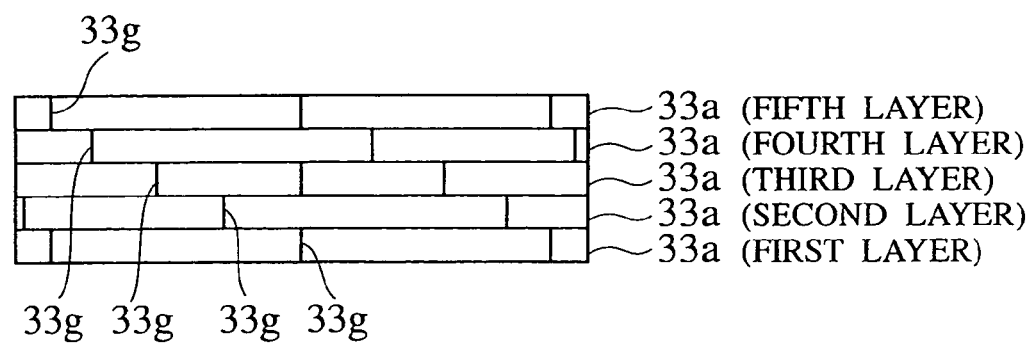
FIG. 16 is a plan view showing the laminated state of the yoke core member shown in FIG. 15.

FIGS. 13 and 14 show the configuration of the yoke core 33. The yoke core 33 includes a laminate 33b obtained by laminating a plurality of ring-like yoke core members 33a shown in FIG. 13, as shown in FIG. 14. The yoke core member 33a is a magnetic member obtained by punching a thin silicon steel plate having a high magnetic permeability with a punch, and further, one circumferential end of an arched unit yoke core member 33c having a predetermined curvature and one circumferential end of another unit yoke core member 33c formed in the same manner as described above are tightened by laser welding or the like in repetition by predetermined times. That is to say, the present embodiment adopts the split core system. Incidentally, the yoke core member 33a is split into twelve parts in the circumferential direction in the present embodiment. Furthermore, since the unit yoke core members 33c all are the same as each other in the present embodiment, the molding and the simplicity can be achieved with only one kind of punch, and further, the automatic assembling work can be facilitated.

At the inner circumference of the yoke core member 33a, recessed cutouts 33d serving as the tightening portion to the tooth core 34 and forming the groove, to which the intrusion of the tooth core 34 is fitted, are cut out by the number of tooth cores 34 in the circumferential direction. Since the 24 tooth cores 34 are formed in the present embodiment, the 24 cutouts 33d are cut out. The two tightening portions in total with respect to the tooth core 34 are formed at the unit yoke core member 33c. Specifically, one tightening portion is formed at the center in the circumferential direction of the inner circumference of the unit yoke core member 33c, and further, a ½ tightening portion is formed at each of both ends in the circumferential direction (i.e., one in total). A projection, not shown, projecting in the opposite direction of side portions 33e and 33f is formed on the opening side of the side portions 33e and 33f of the cutout 33d at the center in the circumferential direction. The projection serves as the tightening portion to the tooth core 34, and is adapted to form the intrusion to be fitted into the groove 34m formed at the tooth core 34.

The laminate 33b is tightened by welding the outer periphery of the yoke core member 33a with a laser after the lamination of the yoke core members 33a. Furthermore, the yoke core members 33a are laminated in the laminate 33b in such a manner that tightening portions (i.e., split portions) 33g of the yoke core member 33a are shifted stepwise, zigzag or in a brick laying manner in the laminating direction of the yoke core members 33a. Specifically, the yoke core member 33a as a second layer is laminated on the yoke core member 33a as a first layer in such a manner that a first tightening portion 33g in the yoke core member 33a as the second layer is shifted at 15° in one circumferential direction with respect to a first tightening portion 33g in the yoke core member 33a as the first layer; and subsequently, the yoke core member 33a as a third layer is laminated on the yoke core member 33a as the second layer in such a manner that a first tightening portion 33g in the yoke core member 33a as the third layer is shifted at 15° in one or the other circumferential direction with respect to the first tightening portion 33g in the yoke core member 33a as the second layer. This process is repeated by the same times as the number of the lamination of the yoke core members 33a, thus obtaining the laminate 33b. In the above-described process, a plurality of groups consisting of yoke cores may be formed, and then, they may be laminated such that the tightening portions 33g in the yoke core members 33a between the adjacent groups consisting of the yoke cores. In the present embodiment in which the yoke core members 33a are laminated in the above-described manner, the welding surface of the adjacent yoke core members 33a in the laminating direction is shifted, thereby enlarging the welding surface, so as to reduce the magnetic resistance.

Figure 17:
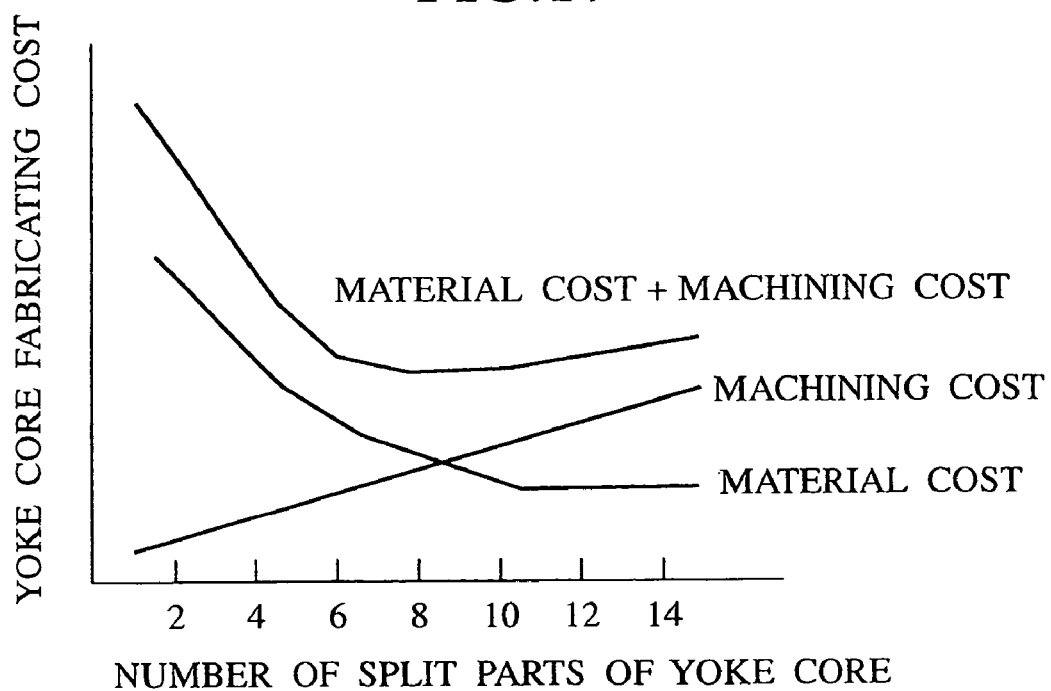
FIG. 17 is a graph illustrating the relationship between the fabricating cost of the yoke core and the number of split parts of the yoke core member.

The number of split parts of the yoke core member 33a depends upon the following relationship. Hereinafter, a description will be given below in reference to FIG. 17. FIG. 17 is a graph illustrating one example of a trial calculation of the relationship between the number of split parts of the yoke core member 33a and the fabricating cost (i.e., the sum of a machining cost and a material cost) of the yoke core. The machining cost tends to be increased substantially in proportion to the number of split parts of the yoke core member 33a. The material cost tends to be decreased as the number of split parts of the yoke core member 33a is increased. These tendencies signify that as the number of split parts of the yoke core member 33a is increased, the degree of freedom of the layout of the silicon steel plate by punching is increased, so that the silicon steel plate can be effectively utilized (that is, the number of unit yoke core members 33c obtained from one piece of silicon steel plate is increased). From the above-described tendencies, the fabricating cost (i.e., the sum of the machining cost and the material cost) of the yoke core becomes optimum when the number of split parts of the yoke core member 33a is from six to twelve.

From the above-described result and the fact that a material utilizing ratio is high when the splitting angle of the yoke core member 33a is about 60° or less, it has been found that the yoke core can be simplified in structure and fabricated at an inexpensive cost if the relationship between the number of split parts of the yoke core with respect to the number of tooth cores is set in the three-phase rotating electric machine in the present embodiment, as described below. That is to say, if the number of split parts of the yoke core is set to m or 3×m/2ⁿ (wherein n is a natural number) in the case where the number of tooth cores is 3×m (wherein m is an integer of 4 or more) in the three-phase rotating electric machine, the yoke core can be simplified in structure and fabricated at an inexpensive cost. Therefore, since the number of tooth cores 34 is 24 in the electric motor 10 in the present embodiment, the optimum number of split parts of the yoke core, in which the yoke core can be simplified in structure and fabricated at an inexpensive cost, is six, eight or twelve.

In the case where the number of tooth cores 34 is 24 and the number of split parts of the yoke core member 33a in the circumferential direction is six in the electric motor 10 in the present embodiment, the yoke core member 33a is configured as shown in FIG. 18. Namely, the tightening portions to the tooth core 34 formed in one unit yoke core member 33c is four in total (in other words, three tightening portions are formed at the center in the circumferential direction on the inner circumference of the unit yoke core member 33c and a ½ tightening portion is formed at each of both ends in the circumferential direction, i.e., one in total). Otherwise, a laminate shown in FIG. 16 can be obtained by laminating yoke core members 33a shown in FIG. 15 in such a manner that tightening portions (i.e., split portions) are shifted at 15° in the circumferential direction.

Since the mold (i.e., the slot insulator 36) is brought into close contact with the side circumferential surface of the tooth core 34 in the above-described present embodiment, an air layer is hardly formed between the tooth core 34 and the unit winding 32a, and further, the thickness of the winding wound portion 36a of the mold is smaller than those at the other portions, thereby reducing the thermal resistance between the tooth core 34 and the unit winding 32a. Consequently, it is possible in the present embodiment to enhance the thermal transmittance of the heat generated in the unit winding 32a to the tooth core 34, and therefore, to efficiently radiate the heat generated in the unit winding 32a in the air via the tooth core 34, the yoke core 33 and the stator frame 20 (or to efficiently transmit the heat generated in the unit winding to a cooling medium in a liquid cooling type in which cooling water or cooling oil is circulated inside of the stator frame), so as to enhance the cooling efficiency of the stator winding 32. Thus, the electric motor 10 can be reduced in size and weight in the present embodiment.

Moreover, the thickness of each of the winding frame 36b on the tooth core tip side and the winding frame 36c on the yoke core tightening portion side of the mold (i.e., the slot insulator) is greater than that of the winding wound portion 36a in the present embodiment, thereby keeping the strength of each of the winding frame 36b on the tooth core tip side and the winding frame 36c on the yoke core tightening portion side, and therefore, preventing any trouble from occurring during the winding work of the winding conductor 32b due to the breakage of the winding frame 36b on the tooth core tip side or the winding frame 36c on the yoke core tightening portion side.

Figure 20:
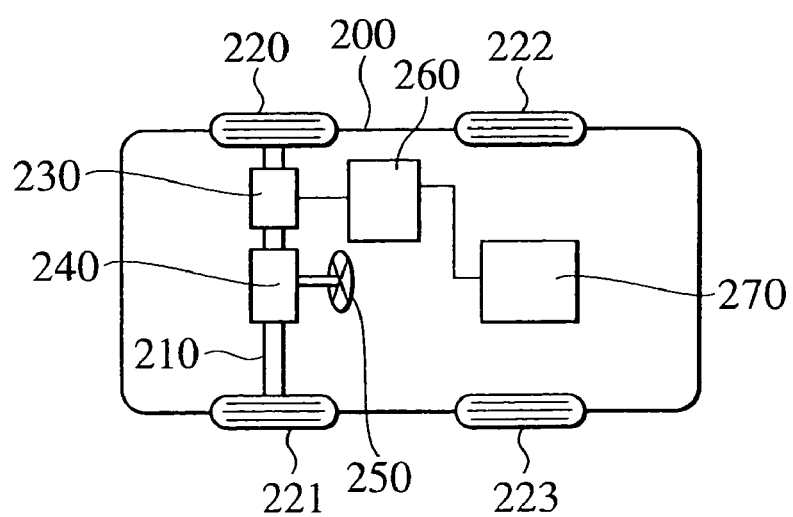
FIG. 20 is a block diagram illustrating the configuration of a motor-driven vehicle in the preferred embodiment according to the present invention.

Subsequently, a description will be given below of a motor-driven vehicle in a preferred embodiment according to the present invention. FIG. 20 is a block diagram schematically illustrating the configuration of the motor-driven vehicle in the preferred embodiment according to the present invention. The motor-driven vehicle in the present embodiment is an electric car having an electric motor 230 as a single drive source, in which the above-described electric motor 10 is used as the electric motor 230. In FIG. 20, reference numeral 200 designates a vehicle body. An axle 210 is rotatably disposed in the front portion of the vehicle body 200. At both ends of the axle 210, there are provided wheels 220 and 221 serving as front wheels as well as drive wheels. In the rear portion of the vehicle body 200, there are rotatably provided wheels 222 and 223 serving as rear wheels as well as not-drive wheels.

The electric motor 230 is connected directly to the axle 210. The electric car in the present embodiment adopts a front wheel drive system. Incidentally, in the case where no axle is provided, the electric motor is connected directly to each of the front wheels. In the case where a rear wheel drive system is adopted, the electric motor is connected directly to each of the rear wheels. If the rear wheels are disposed at both ends of the axle, the electric motor is connected directly to the axle. The electric motor may be mechanically connected to the axle via a power transmission mechanism, for example, a differential gear such that the rotating power of the electric motor can be transmitted to the axle. Otherwise, a transmission may be mechanically connected between the electric motor and a power transmission mechanism.

The axle 210 is provided with a motor-driven type power steering device 240 for assisting the steering of the front wheels by operating a steering wheel 250 by a driver. The power steering device includes a hydraulic type in addition to the motor-driven type. The power steering device 240 is adapted to transmit the rotating drive force of the electric motor to a deceleration gear connected directly to a shaft of the steering wheel 250. The electric motor is controlled on the basis of detection results such as the steering angle and steering torque of the steering wheel 250. The steering torque by the driver and the steering assist torque of the electric motor are transmitted to a tie rod of the front wheel from the deceleration gear via a universal joint and a pinion-rack mechanism. In this manner, the front wheels can be steered.

To the electric motor 230 is electrically connected a controller 260 for controlling the drive of the electric motor 230. The controller 260 includes a power converter, a control unit for controlling the power converter, neither shown, and the like. The power converter is an inverter for turning on or off a switching element consisting of a semiconductor element such as an IGBT or an MOS-FET upon receipt of a control signal from the control unit, and then, converting a DC voltage supplied from a battery 270 serving as a vehicle power source and an accumulator into an AC voltage, and thus, applying the resultant AC voltage as a drive voltage to the electric motor 230. The control unit calculates a control signal used for controlling the power converter in accordance with a torque command output from the host controller, and then, outputs the control signal to the power converter.

In the present embodiment, the description has been given of the electric car exemplifying the motor-driven vehicle. Besides the electric car, the motor-driven vehicle is exemplified in a hybrid car which is an environmentally friendly car, like the electric car, and drives drive wheels by the aid of an engine, i.e., an internal combustion engine and an electric motor to be driven by electric power supplied from a battery serving as a vehicle-mounted power source. In addition, examples of the motor-driven vehicle include a four-wheel drive vehicle, in which one of drive wheels is driven by an engine, i.e., an internal combustion engine while the other drive wheel is driven by an electric motor to be driven by a power generator driven by the internal combustion engine or an electric motor to be driven by electric power supplied from a battery serving as a vehicle-mounted power source. Additionally, examples of the motor-driven vehicle include a battery type fork lift as an industrial vehicle for loading or unloading baggage, in which a drive wheel is driven by an electric motor to be driven by electric power supplied from a battery serving as a vehicle-mounted power source.

In the above-described present embodiment, since the above-described electric motor 10 is used as the electric motor 230, it is possible to satisfy the demands (for example, the reduction in size and weight, the optimum for the rotation at a high speed, the high efficiency, the high output and the reduced cost) for the rotating electric machine, which is used as the drive source for the motor-driven vehicle, in particular, the environmentally friendly car.

In the rotating electric machine according to the present invention as described above, it is possible to reduce the thermal resistance generated between the stator winding and the stator iron core, to enhance the thermal transmittance of the heat generated in the stator winding to the stator iron core, and to enhance the cooling efficiency of the stator winding. Thus, according to the present invention, it is possible to provide the rotating electric machine, which can be reduced in size and weight and is suitable for the motor-driven vehicle, at an inexpensive cost. Furthermore, according to the present invention, it is possible to provide the motor-driven vehicle mounting the rotating electric machine thereon.

While the invention has been described in its preferred embodiments, it is to be understood that the words which have been used are words of description rather than limitation and that changes within the purview of the appended claims may be made without departing from the true scope and spirit of the invention in its broader aspects.

What claimed is:

1. A rotating electric machine comprising a stator and a rotor disposed rotatably with respect to the stator via a clearance, wherein said stator has a stator core, a stator winding incorporated in the stator core, and a mold made of an insulating resin provided on the stator core, wherein said stator core is comprised of an annular yoke core and a plurality of teeth cores projecting from the yoke core in one radial direction, wherein said stator winding is comprised of a winding conductor wound on each of the plurality of the teeth cores via the insulating resin mold in a concentric winding manner, the insulating resin mold is installed on each of the plurality of the teeth cores by insert-molding and has a winding portion disposed closely on the surface of each of the plurality of the teeth cores, wherein the winding portion is a portion of the insulating resin mold on which portion the winding conductor is wound and the thickness of the winding portion is smaller than that of the portion other than the winding portion on the insulating resin mold, and wherein the plurality of the teeth iron cores, being formed separately from the yoke core, have the insulating resin mold installed thereon by insert-molding and are fitted on the yoke core with the winding conductor wound on the winding portion, wherein grooves are formed at the surface of each of the teeth, at which the insulating resin is inserted and around which the stator winding is wound, and at both surfaces of a core laminated thick surface formed by laminating the iron cores in such a manner as to be continuously formed from one laminating end of the iron core to the other laminating end of the iron core, and further, in such a manner that a position in the radial direction of the stator at one surface are different from that at the other surface.

2. A rotating electric machine as claimed in claim 1, wherein the portion other than the winding portion on the insulating resin mold is a winding frame that guides the winding conductor into the winding portion during winding work of the winding conductor and holds the winding conductor wound on the winding portion.

3. A rotating electric machine as claimed in claim 1, wherein each said teeth core is comprised of a lamination of a plurality of iron cores.

4. A rotating electric machine as claimed in claim 1, wherein each of the teeth core has an assembly guide for guiding the assembly work in the yoke, the assembly guide being formed integrally with the mold with the insulating resin.

5. A rotating electric machine as claimed in claim 1, wherein each of the teeth has a connection fixing portion for fixing connecting parts for use in connecting terminals of the stator winding to each other, the connection fixing portion being formed integrally with the mold with the insulating resin.

6. A rotating electric machine comprising a stator and a rotor disposed rotatably with respect to the stator via a clearance, wherein said stator has a stator core, a stator winding incorporated in the stator core, and a mold made of an insulating resin provided on the stator core, wherein said stator core is comprised of an annular yoke core and a plurality of teeth cores projecting from the yoke core in one radial direction, wherein said stator winding is comprised of a winding conductor wound on each of the plurality of the teeth cores via the insulating resin mold in a concentric winding manner, the insulating resin mold is installed on each of the plurality of the teeth cores by insert-molding and has a winding portion disposed closely on the surface of each of the plurality of the teeth cores, wherein the winding portion is a portion of the insulating resin mold on which portion the winding conductor is wound and the thickness of the winding portion is smaller than that of the portion other than the winding portion on the insulating resin mold, and wherein the plurality of the teeth iron cores, being formed separately from the yoke core, have the insulating resin mold installed thereon by insert-molding and are fitted on the yoke core with the winding conductor wound on the winding portion, wherein grooves are formed continuously in the laminating direction of the iron cores at the surface of each of the teeth, at which the insulating resin is inserted and around which the stator winding is wound, and at a portion in the vicinity of a gate position of the insulating resin molding of a core laminated thick surface formed by laminating the iron cores.

7. A rotating electric machine comprising a stator and a rotor disposed rotatably with respect to the stator via a clearance, wherein said stator has a stator core, a stator winding incorporated in the stator core, and a mold made of an insulating resin provided on the stator core, wherein said stator core is comprised of an annular yoke core and a plurality of teeth cores projecting from the yoke core in one radial direction, wherein said stator winding is comprised of a winding conductor wound on each of the plurality of the teeth cores via the insulating resin mold in a concentric winding manner, the insulating resin mold is installed on each of the plurality of the teeth cores by insert-molding and has a winding portion disposed closely on the surface of each of the plurality of the teeth cores, wherein the winding portion is a portion of the insulating resin mold on which portion the winding conductor is wound and the thickness of the winding portion is smaller than that of the portion other than the winding portion on the insulating resin mold, and wherein the plurality of the teeth iron cores, being formed separately from the yoke core, have the insulating resin mold installed thereon by insert-molding and are fitted on the yoke core with the winding conductor wound on the winding portion, wherein grooves are formed at the surface of each of the teeth, at which the insulating resin is inserted and around which the stator winding is wound, and at both surfaces of a core laminated thick surface formed by laminating the iron cores in such a manner as to be formed continuously in the laminating direction of the iron cores, and further, in such a manner that a position in the radial direction of the stator and a position in the laminating direction of the iron cores are different at one surface from those at the other surface.

8. A rotating electric machine comprising a stator and a rotor disposed rotatably with respect to the stator via a clearance, wherein said stator has a stator core, a stator winding incorporated in the stator core, and a mold made of an insulating resin provided on the stator core, wherein said stator core is comprised of an annular yoke core and a plurality of teeth cores projecting from the yoke core in one radial direction, wherein said stator winding is comprised of a winding conductor wound on each of the plurality of the teeth cores via the insulating resin mold in a concentric winding manner, the insulating resin mold is installed on each of the plurality of the teeth cores by insert-molding and has a winding portion disposed closely on the surface of each of the plurality of the teeth cores, wherein the winding portion is a portion of the insulating resin mold on which portion the winding conductor is wound and the thickness of the winding portion is smaller than that of the portion other than the winding portion on the insulating resin mold, and wherein the plurality of the teeth iron cores, being formed separately from the yoke core, have the insulating resin mold installed thereon by insert-molding and are fitted on the yoke core with the winding conductor wound on the winding portion, wherein the yoke includes a laminate consisting of a plurality of annular iron cores, split in a circumferential direction, the circumferential position of split parts of the iron core being shifted in each of the iron cores in a brick laying manner, zigzag or stepwise in the laminating direction of the iron cores.

9. A rotating electric machine as claimed in claim 1, wherein the number of split parts of the iron core is m or an integer of $3 \times m/2^n$ (wherein n is a natural number) when the number of teeth is $3 \times m$ (wherein m is an integer of 4 or more).

10. A rotating electric machine as claimed in claim 1, wherein the number of split parts of the iron core is 6 to 12.

11. A rotating electric machine as claimed in claim 6, wherein each of the teeth core has an assembly guide for guiding the assembly work in the yoke, the assembly guide being formed integrally with the mold with the insulating resin.

12. A rotating electric machine as claimed in claim 7, wherein the portion other than the winding portion on the insulating resin mold is a winding frame that guides the winding conductor into the winding portion during winding work of the winding conductor and holds the winding conductor wound on the winding portion.

13. A rotating electric machine as claimed in claim 8, wherein the portion other than the winding portion on the insulating resin mold is a winding frame that guides the winding conductor into the winding portion during winding work of the winding conductor and holds the winding conductor wound on the winding portion.

14. A rotating electric machine as claimed in claim 6, wherein each said teeth core is comprised of a lamination of a plurality of iron cores.

15. A rotating electric machine as claimed in claim 7, wherein each said teeth core is comprised of a lamination of a plurality of iron cores.

16. A rotating electric machine as claimed in claim 8, wherein each said teeth core is comprised of a lamination of a plurality of iron cores.

17. A rotating electric machine as claimed in claim 6, wherein each of the teeth has a connection fixing portion for fixing connecting parts for use in connecting terminals of the stator winding to each other, the connection fixing portion being formed integrally with the mold with the insulating resin.

18. A rotating electric machine as claimed in claim 7, wherein each of the teeth has a connection fixing portion for fixing connecting parts for use in connecting terminals of the stator winding to each other, the connection fixing portion being formed integrally with the mold with the insulating resin.

19. A rotating electric machine as claimed in claim 8, wherein each of the teeth has a connection fixing portion for fixing connecting parts for use in connecting terminals of the stator winding to each other, the connection fixing portion being formed integrally with the mold with the insulating resin.

20. A rotating electric machine as claimed in claim 6, wherein the number of split parts of the iron core is m or an integer of $3 \times m/2^n$ (wherein n is a natural number) when the number of teeth is $3 \times m$ (wherein m is an integer of 4 or more).

21. A rotating electric machine as claimed in claim 7, wherein the number of split parts of the iron core is m or an integer of $3 \times m/2^n$ (wherein n is a natural number) when the number of teeth is $3 \times m$ (wherein m is an integer of 4 or more).

22. A rotating electric machine as claimed in claim 8, wherein the number of split parts of the iron core is m or an integer of $3 \times m/2^n$ (wherein n is a natural number) when the number of teeth is $3 \times m$ (wherein m is an integer of 4 or more).

23. A rotating electric machine as claimed in claim 6, wherein the number of split parts of the iron core is 6 to 12.

24. A rotating electric machine as claimed in claim 7, wherein the number of split parts of the iron core is 6 to 12.

25. A rotating electric machine as claimed in claim 8, wherein the number of split parts of the iron core is 6 to 12.

* * * * *